Jan. 12, 1926.  1,569,420
A. B. CLISSON
CLUTCH MECHANISM
Filed Feb. 26, 1924   3 Sheets-Sheet 1
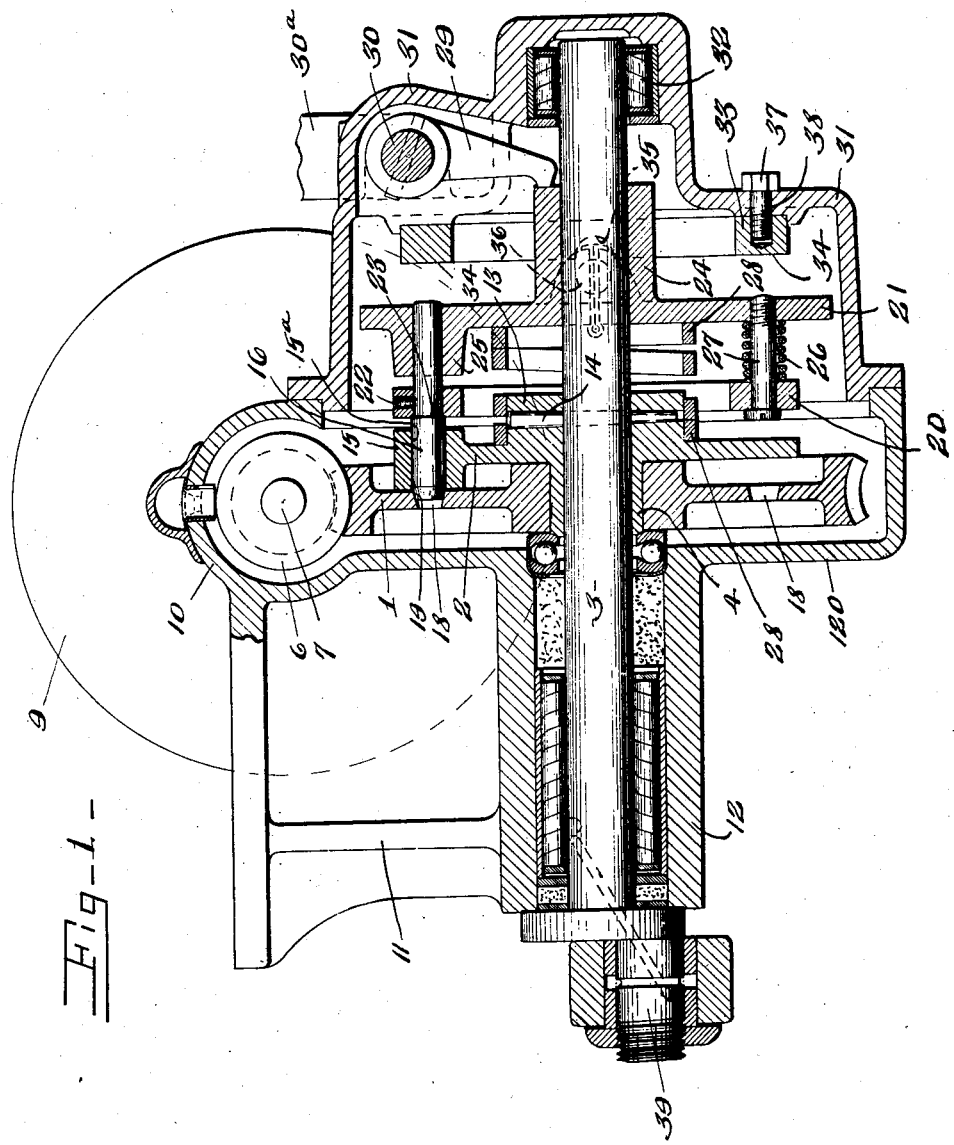
Fig-1-
INVENTOR.
Albert B. Clisson
BY Parsons & Brodell
ATTORNEYS.

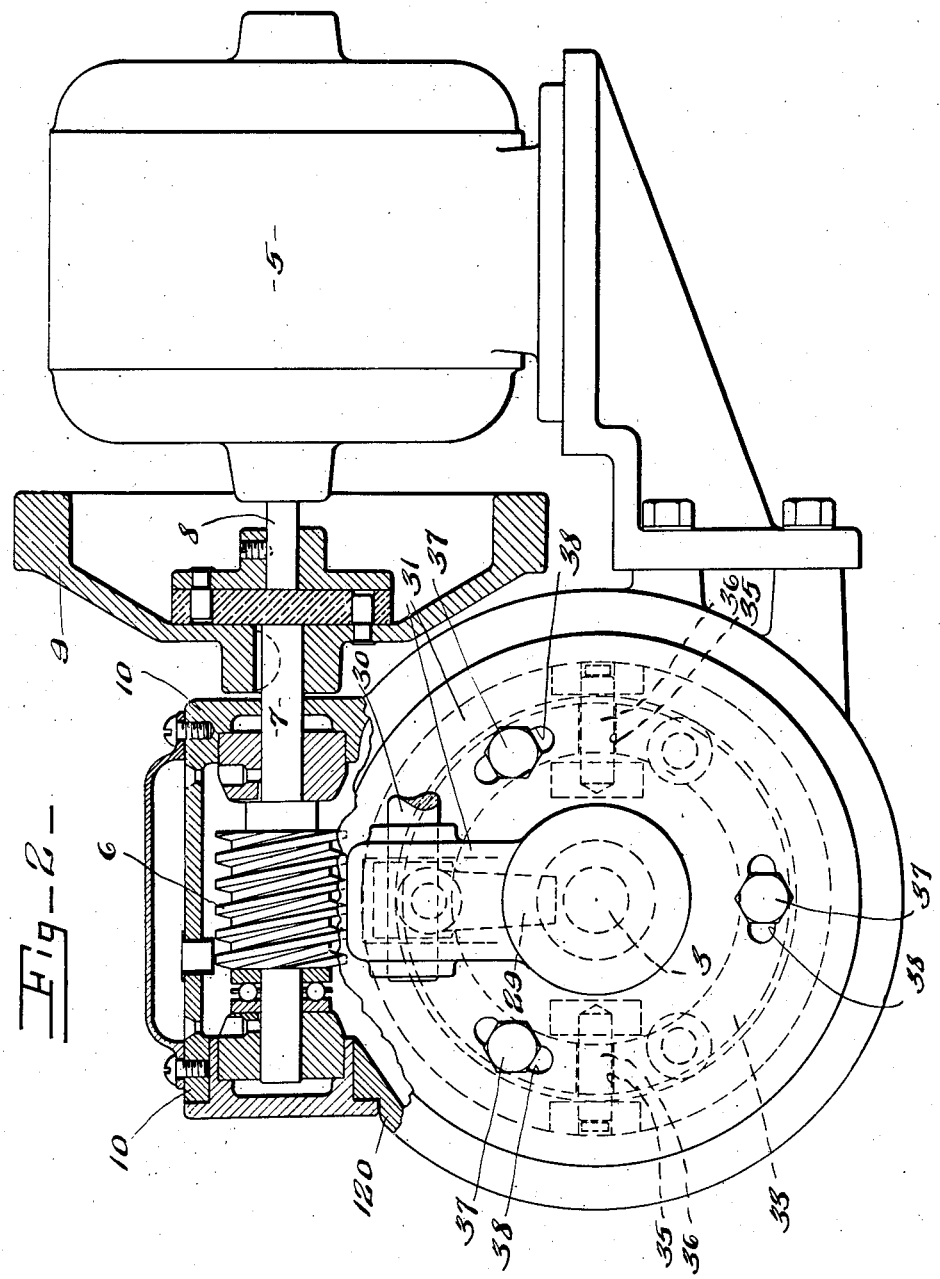

Jan. 12, 1926.  1,569,420
A. B. CLISSON
CLUTCH MECHANISM
Filed Feb. 26, 1924   3 Sheets-Sheet 3
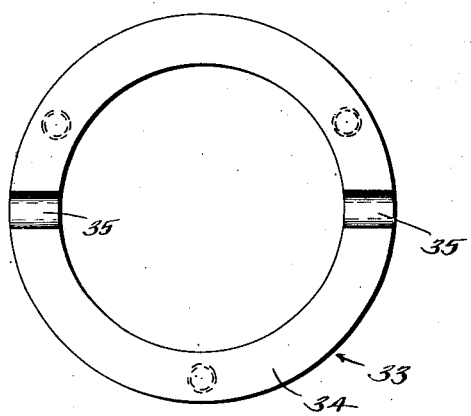
Fig-6-
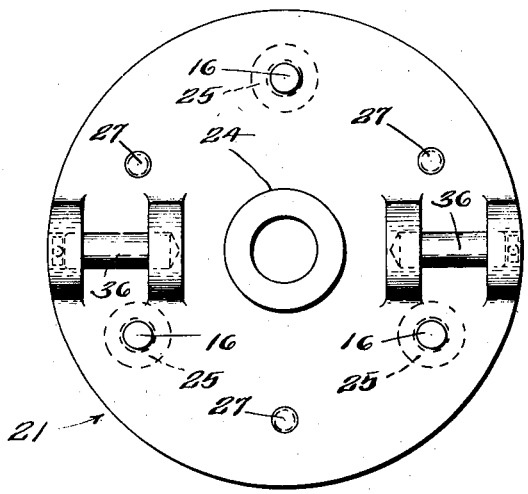
Fig-3-
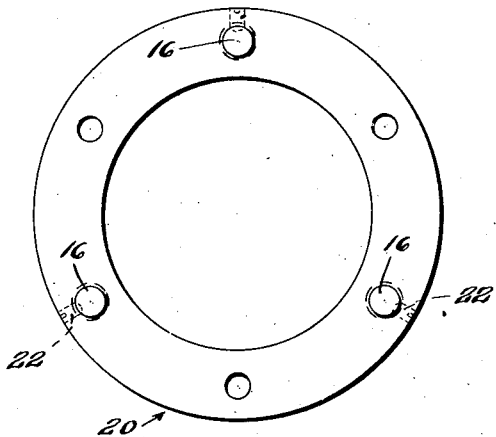
Fig-4-
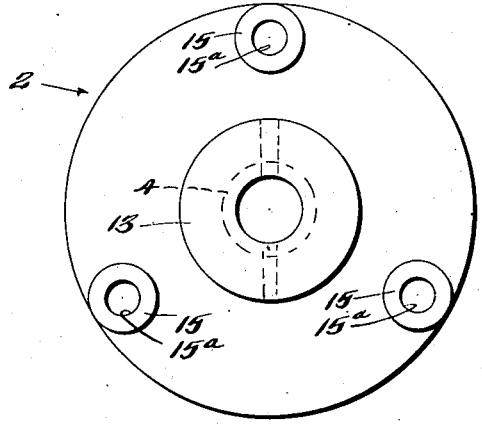
Fig-5-
INVENTOR.
Albert B. Clisson
BY
Parsons & Birdell
ATTORNEYS.

Patented Jan. 12, 1926.

1,569,420

UNITED STATES PATENT OFFICE.

ALBERT B. CLISSON, OF GEDDES, NEW YORK, ASSIGNOR, BY MESNE ASSIGNMENTS, TO LIBERTY NATIONAL BANK, TRUSTEE, OF SYRACUSE, NEW YORK.

CLUTCH MECHANISM.

Application filed February 26, 1924. Serial No. 695,247.

*To all whom it may concern:*

Be it known that I, ALBERT B. CLISSON, a citizen of the United States, and a resident of Geddes, in the county of Onondaga and State of New York, have invented a certain new and useful Clutch Mechanism, of which the following is a specification.

This invention relates to motion transmitting mechanism embodying a periodic clutch by which an intermittent movement is transferred from a constantly running driving element to a driven element, which mechanism is particularly simple and compact in construction, economical in manufacture, and highly efficient and durable in use, and which is particularly applicable for controlling the operation of the press heads of garment and laundry pressing machines, which are opened and closed through toggle mechanism, levers, etc.

The invention consists in the novel features and in the combinations and constructions hereinafter set forth and claimed.

In describing this invention reference is had to the accompanying drawings in which like characters designate corresponding parts in all the views.

Figure 1 is a longitudinal sectional view of the motion transmitting mechanism embodying my invention.

Figure 2 is an end elevation, partly in section, looking to the left in Fig. 1.

Figures 3, 4 and 5 are face views of the shifting member, pressure ring, and driven element of this mechanism.

Figure 6 is a face view of the means for holding the clutch engaged and timing the disengagement thereof, whereby a limited rotary or start and stop movement is imparted to the driven element.

This motion transmitting mechanism, comprises concentric driving and driven elements, the driving element being normally connected to a motor means which constantly rotates such element, and the driven element being arranged adjacent the driving element, clutch teeth or pins carried by one of said elements, preferably by the driven element, and shiftable in one direction relatively to the driven element into interlocking engagement with the driving element, and also shiftable in the opposite direction out of engagement with the driving element, means for initially yieldingly shifting said teeth into engagement with the driving element, and finally positively shifting and holding the teeth engaged with the driving element, such means being manually operable in one direction, spring means tending to automatically operate such means in the opposite direction, and holding means arranged to hold the teeth engaged with the driving element during a predetermined amount of rotation of the driving element.

This mechanism is particularly applicable for garment and laundry power pressing machines, for instance, such as those in my pending applications Sr. No. 598,966, filed Nov. 4, 1922, and Sr. No. 683,151, filed Dec. 28, 1923, and of Aquila R. Braun, Sr. No 650,806, filed July 11, 1923.

1 designates the driving element, and 2 the driven element, the latter being mounted on and rotatable with a shaft 3, from which the power is taken, and to which a start and stop motion is transmitted from the driving element 1. The driving element 1 is mounted concentrically with the shaft 3, and as here shown is rotatably mounted on the hub 4 of the driven element 2. The driving element is here shown as a worm gear, which is connected to a suitable source of power, as an electric motor, 5, through a worm 6 mounted on a shaft 7, suitably coupled to the armature shaft 8 of the motor.

A suitable flywheel 9 is mounted upon the shaft 7. The shaft 7 is journalled in suitable bearings formed in the housing or casing 10 which in turn is carried by a bracket 11, carrying a hub or bearing 12 for one end of the shaft 3, and a casing 120 for the driving wheel 1.

The driven element 2 is here shown as a disk or wheel, having a hub 4 on one side thereof, on the shaft 3, and a hub 13 on the other side thereof, the hub 13 being connected to the shaft 3 by suitable means as a pin or key 14.

As seen in Figure 5 the driven element 2 is formed with a plurality of projections or bosses 15 having guide openings 15ª therethrough, substantially parallel to the shaft 3, the ends of these bosses lying adjacent or close to the side face of the driving element or worm gear 1.

The clutch means for connecting the driving and driven elements 1, 2 is here shown as rotatable with the driven element 2, or shaft 3, and shiftable into and out of interlocking engagement with the driving element.

This clutch mechanism includes teeth associated with the driven element 2, here shown as pins 16 which are slidable in the guide openings 15ᵃ in a general direction parallel to the axis of the wheels 1, 2, and shaft 3 into and out of interlocking engagement with the driving wheel 1, they being normally arranged within or behind the faces of the bosses 15 of the wheel 1, and operable relatively to the driven element or wheel 2, to project beyond such faces into holes 18 or sockets in the driving wheel 1, the holes 18 being provided in a circular series around the axis of the shaft 3.

The mechanism for shifting these pins 16 acts to automatically shift the pins 16 out of engagement with the wheel 1 or out of the sockets 18, and such shifting mechanism is manually operable to initially yieldingly press the pins 16 toward the wheel 1 and permit the pins to yield in case they are not alined with any of the sockets 18, and finally to thrust or press and hold the pins 16 in the sockets 18. The pins 16 are tapered at their ends as at 19, and the sockets are correspondingly tapered, and hence the pins have a tendency to free themselves during the rotation of the wheel 1.

The means for controlling the operation of the pins 16 comprises a pressure ring 20 arranged concentrically with the shaft 3, it being secured to the pins 16, a shifting member 21 mounted on the shaft 3, to slide axially thereof, manually operable means for shifting the member 21 to carry the pins into operative position, automatic means tending to shift the member 21 out of operative position, and mechanism for holding the member 21 in its operative position while the driving wheel 1 is making a predetermined rotation, as for instance a half revolution.

The pressure ring 20, Fig. 4, is provided with openings through which the pins 16 extend and is secured to such pins in any suitable manner, as by set screws 22, the pressure ring 20 shouldering against shoulders 23 on the pins 16. Hence the set screws are relieved of violent strains during the operation of the clutch, and need only be of sufficient strength to hold the pins from sliding in the ring when the pins are idle or out of the sockets 18.

The shifting member 21 is discoidal in general form and has a hub 24, rotatably mounted on the shaft 3, and shiftable axially thereof, and also is provided with a plurality of bosses 25 having guide holes therein, for the pins 16. These bosses 25 are in line with the bosses 15 of the driven element 2 and the end faces thereof are normally spaced apart from the pressure ring 20.

Springs 26 are interposed between the pressure ring 20 and the shifting member 21, these springs being here shown as encircling pins or screws 27 extending transversely through the ring 20, and being secured as by screw threads to the shifting member 21. The pins are slidably mounted in the ring 20. Usually there are three pins 16, three bosses 15 on the driven wheel 2, and three bosses 25 on the shifting member 21, and several times as many sockets or holes 18 in the driving wheel 1.

The shifting member 21 is shifted automatically to carry the pins 16 out of the holes 18 by spring means of greater strength than the springs 26, this spring means being here shown as a main spring 28, coiled about the hub 13 of the wheel 2, and thrusting at one end against the driven wheel 2 and at its other end against the shifting member 21.

The manual means for shifting the member 21 against the action of the spring 28 and the springs 26 as here shown comprises a lever 29, mounted on a shaft 30 journalled in a housing 31, and a suitable handle or handle connection 30ᵃ is mounted on the shaft. The lever 29 thrusts against the hub 24 of the shifter 21.

The housing 31, is in the form of a cap detachably mounted on the housing 10 enclosing the worm 6, and the wheel 1, and is secured in position in any suitable manner. This housing 31 is also provided with a bearing 32 at one end of the shaft.

The means for holding the member 21 in the position to which it has been manually shifted against the action of the springs 28 and 26, and hence holding the pins 16 in clutched position in the holes 18 of the driving wheel 1, comprises a circular track 33, mounted on the inner face of the housing 31, concentric with the shaft 3 at one side of and spaced apart from the shifting member 21. This track has a flat face 34 and a depression or depressions 35 and a follower or followers 36, carried by the shifting means 21 and normally arranged in the depression or depressions 35 to move out of the depression or depressions on to the flat face 34 when the member 21 has been shifted by the lever 29. As the shaft 3 makes a half revolution there are two depressions 35 and followers 36 located at opposite sides of the axis of the shaft 3.

The track is adjustably mounted in order to arrange the depressions 35, in any desired position, in order to time or synchronize the mechanism to be operated by the shaft 3, and as here shown the ring is held in position by screws 37 extending through the end wall of the housing 31, and threading into the track 33. These screws pass through arc-shaped slots 38 in the end wall of the housing 31.

The shaft 3 may operate a cam or crank as 39, which may be connected by a link or pitman or connecting rod to a toggle mechanism, as seen in pending application, Sr. No. 598,966, or may coact with a lever as shown in pending applications Sr. Nos. 650,806 and 683,151.

In operation the driving wheel is constantly rotating. Upon operation of the lever 29 the shifting ring 21 is shifted by the lever first against the action of the weaker springs 26. In the event the pins 16 are not in line with the holes 18 of the driving wheel 1, the springs 26 compress and immediately upon such pins 16 coming into alinement with the sockets 18, the springs react, and force the pressure ring 20 to the left to carry the pins 16 into interlocking engagement with the driving wheel 1. Such shifting movement is also against the action of the stronger spring 28, but the springs 26 permit relative movement of the shifting member 21 and the pressure ring 20.

When the pins 16 enter the holes 18, or engage the driving wheel 1, and enter the holes 18 when such holes are alined with the pins, the followers 36 are shifted out of the depressions 35. As the driven element 2 is now interlocked with the driving wheel 1, the shifting member 21 is rotated and the followers 36 move along the surface 34 of the track 33, so that the track holds the shifting member 21 in its shifted position and the pins 16 in the sockets 18, until the wheel 1 and shaft 3 have made a half revolution when the followers 36 again come into alinement with the depressions 35.

The spring 28 is now free to react, and thrust the shifting member 21 to the right and disconnect the pins 16 from the driving wheel 1. Also the followers move into the depressions and hold the shaft from overthrow.

This mechanism is particularly simple and compact in construction, and owing to the pins 16 shifting relatively to the driven element and the location of the driven element 2 close to the wheel 1, there is practically no shearing strain on the pins 16, and the mechanism operates smoothly and without shock.

What I claim is:—

1. In a clutch, a constantly rotating driving element formed with sockets, a driven element mounted concentric with the driving element, and having a face opposed and contiguous to the driving element, the driven element being fixed from axial movement, teeth in the form of pins slidably mounted in the driven element substantially parallel to the axis of said element, and arranged to be projected beyond the face of the driven element into said sockets, means for shifting said pins into and out of the sockets, comprising a pressure ring carried by the pins, a shifting member mounted concentric with the driving and driven elements, the pins being slidable in said member, the pressure ring being normally spaced-apart from the shifting member, spring means interposed between the pressure ring and said shifting member and normally holding the same spaced-apart, and mechanism for shifting the shifting member against the action of the spring means and taking up the lost motion between the pressure ring and the shifting member.

2. In a clutch, the combination of a constantly rotating driving element formed with sockets, a driven element mounted concentric with the driving element adjacent the same, and fixed from axial movement, teeth in the form of pins slidably mounted in the driven element substantially parallel to the axis thereof, and arranged to be projected into the sockets, means for shifting said pins into and out of the sockets, comprising a pressure ring concentric with the driven element, a shifting member mounted concentric with the driving and driven elements, the pins being slidable in said member, the pressure ring being normally spaced-apart from the shifting member, springs interposed between the pressure ring and the shifting member, a main spring interposed between the driven element and the shifting member, and manual means for shifting the shifting member against the action of said springs.

3. The combination of a driving element, a driven shaft, the driving element being mounted concentric with the shaft, and rotatable about the same, a driven element mounted on and rotatable with the shaft, adjacent the driving element, the driving element being formed with sockets, pins slidably mounted in the driven element, substantially parallel to the axes of said elements, and arranged to be projected into the sockets, a pressure ring mounted on and movable with the pins, a shifting member mounted on the shaft and slidable axially thereof, the pins also being slidably mounted in the shifting member, and the shifting member being spaced-apart from the pressure ring, springs interposed between the pressure ring and the shifting member, a main spring interposed between the driven element and the shifting member, and means for shifting said member against the action of the springs.

4. In a clutch, the combination of a constantly rotating driving element formed with sockets, a driven element mounted concentric with the driving element adjacent the same, and fixed from axial movement, teeth in the form of pins slidably mounted in the driven element substantially parallel to the axis of the driven element, and arranged to be projected relatively to the driven element into the sockets, means for shifting said pins into and out of the sockets, comprising a pressure ring carried by the pins, a shifting member mounted concentric with the driving and driven elements, the pins being slidable in said member, the pressure ring being normally spaced-apart from the shifting member, springs interposed between the pressure ring and the shifting member, a main spring interposed between the driven element and the shifting member, and manual means for shifting the shifting member against the action of said springs, a stationary track arranged concentric with the shaft and formed with a depression, and a follower carried by the shifting member and movable along the track and into the depression.

In testimony whereof, I have hereunto signed my name, at Syracuse, in the county of Onondaga, and State of New York, this 22nd day of Feb., 1924.

ALBERT B. CLISSON.